US011132001B2

(12) United States Patent
Reuter (10) Patent No.: US 11,132,001 B2
(45) Date of Patent: Sep. 28, 2021

(54) RADAR APPARATUS AND METHOD

(71) Applicant: NXP USA, INC., Austin, TX (US)

(72) Inventor: Ralf Reuter, Landshut (DE)

(73) Assignee: NXP USA, INC., Austin, TX (US)

( * ) Notice: Subject to any disclaimer, the term of this patent is extended or adjusted under 35 U.S.C. 154(b) by 234 days.

(21) Appl. No.: 16/221,822

(22) Filed: Dec. 17, 2018

(65) Prior Publication Data

US 2019/0204846 A1 Jul. 4, 2019

(30) Foreign Application Priority Data

Jan. 2, 2018 (EP) ..................................... 18150105

(51) Int. Cl.
*G05D 1/02* (2020.01)
*G01S 13/931* (2020.01)
(Continued)

(52) U.S. Cl.
CPC .............. *G05D 1/0257* (2013.01); *G01S 7/03* (2013.01); *G01S 7/4004* (2013.01);
(Continued)

(58) Field of Classification Search
CPC ....... G05D 1/0257; G01S 7/03; G01S 7/4017; G01S 7/4004; G01S 13/931;
(Continued)

(56) References Cited

U.S. PATENT DOCUMENTS

2004/0221208 A1* 11/2004 Floyd .................. G06F 11/1604
714/50
2007/0014269 A1 1/2007 Sherman et al.
(Continued)

FOREIGN PATENT DOCUMENTS

EP       2881752 A1 *  6/2015    ............. G01S 7/032

OTHER PUBLICATIONS

EPO Written Opinion on EP18150105.7, dated Jul. 3, 2018 (Year: 2018).*
(Continued)

*Primary Examiner* — Vladimir Magloire
*Assistant Examiner* — Alexander L. Syrkin (57) ABSTRACT

A radar system (300) and a method of operating the radar system is disclosed, the radar system (300) comprising: a first IC (310), arranged to receive a reference clock signal (380) and configurable to generate a common local oscillator signal (400) based on the reference clock signal (380); a second IC (320), arranged to receive the common local oscillator signal (400) from the first IC (310); and a controller (350), adapted to detect a fault in the first IC (310), and configured, upon detection of a fault in the first IC (310), to send at least one signal to the second IC (320) for reconfiguring the second IC (320) from a slave mode to a master mode; wherein, when operating in the slave mode, the second IC (320) is configured to use the common local oscillator signal (400) generated by the first IC (310), and, when operating in the master mode, said second IC (320) is configured to use an internally-generated local oscillator signal. The second IC (310) may be configured to receive the reference clock signal (380), wherein the internally-generated local oscillator signal is based on the reference clock signal (380).

20 Claims, 4 Drawing Sheets

(51) Int. Cl.
  *G01S 7/40* (2006.01)
  *H04B 10/40* (2013.01)
  *H04B 10/50* (2013.01)
  *H04B 10/60* (2013.01)
  *G01S 7/03* (2006.01)
  *H04J 3/06* (2006.01)

(52) U.S. Cl.
  CPC .......... *G01S 7/4017* (2013.01); *G01S 13/931* (2013.01); *H04B 10/40* (2013.01); *H04B 10/50* (2013.01); *H04B 10/60* (2013.01); *H04J 3/0641* (2013.01); *G01S 2013/9315* (2020.01); *G01S 2013/9321* (2013.01); *G01S 2013/93185* (2020.01)

(58) Field of Classification Search
  CPC ... G01S 2013/9315; G01S 2013/93185; G01S 2013/9321; H04J 3/0641; H04B 10/40; H04B 10/50; H04B 10/60

USPC ........................................................ 342/175
  See application file for complete search history.

(56) References Cited

U.S. PATENT DOCUMENTS

| 2012/0063296 A1* | 3/2012 | Wang .................... H04J 3/0688 370/216 |
| 2015/0153445 A1 | 6/2015 | Jansen |
| 2016/0170010 A1 | 6/2016 | Ygnace et al. |
| 2021/0165088 A1* | 6/2021 | Suzuki .................. G01S 7/4021 |

OTHER PUBLICATIONS

U.S. Appl. No. 16/176,308, filed Oct. 31, 2018, entitled "Radar System Comprising Coupling Device".

* cited by examiner

RADAR APPARATUS AND METHOD

CROSS-REFERENCE TO RELATED APPLICATIONS

This application claims the priority under 35 U.S.C. § 119 of European Patent application no. 18150105.7, filed on 2 Jan. 2018, the contents of which are incorporated by reference herein.

FIELD OF THE INVENTION

The present invention relates to a radar system and a method of operating a radar system. In particular, but not exclusively, the invention relates to a radar system configured, on detection of a fault in a first IC of the radar system, to reconfigure a second IC of the radar system from a slave mode to a master mode, thereby maintaining at least limited functionality of the radar system.

BACKGROUND OF THE INVENTION

Autonomous driving functionality demands an extremely high level of safety in an extremely reliable system, and depends on sensors to obtain information about the surrounding environment. Radar sensors can operate in all weather conditions and allow detection of objects in conditions in which vision-based sensors fail. This capability enables radar to become the safety backbone in an autonomous car.

To enable a radar sensor to become the dominant sensor type and to build the safety backbone for autonomous cars, high angular resolution, target separation and object classification is required. Angular resolution and/or SNR may be increased by cascading multiple radar transceivers and/or radar chipsets (a combination of dedicated receiver and/or transmitter chips) to increase the number of physical receiver and/or transmitter channels.

To enable cascading (both coherent and non-coherent), one of the transceivers (and/or radar chipsets) is assigned as master and the other chips as slaves. The master provides the local oscillator (LO) signal and controls the slave chips in terms of timing. A failure in the master chip causes a full failure of all the slave chips because the timing control signals and/or the LO signal to the slaves are no longer provided.

This in turn causes a full malfunction of the radar sensor.

SUMMARY OF THE INVENTION

Aspects of the invention are set out in the accompanying claims. Combinations of features from the dependent claims may be combined with features of the independent claims as appropriate and not merely as explicitly set out in the claims.

According to a first aspect of the invention, there is provided a radar system comprising:
a first IC, arranged to receive a reference clock signal and configurable to generate a common local oscillator signal based on said reference clock signal;
a second IC, arranged to receive the common local oscillator signal from the first IC; and
a controller, adapted to detect a fault in said first IC, and configured, upon detection of a fault in said first IC, to send at least one signal to said second IC for reconfiguring said second IC from a slave mode to a master mode;
wherein, when operating in said slave mode, said second IC is configured to use the common local oscillator signal generated by the first IC, and, when operating in said master mode, said second IC is configured to use an internally-generated local oscillator signal.

The present invention may thereby enable the radar system, for example a cascaded system such as an array in which the first IC normally operates as a master and the second IC normally operates as one of a number of slave ICs, to maintain at least a minimum level of functionality even when a fault is detected in the first IC. This is particularly important for radar sensors critical for safe operation of autonomous vehicles.

The second IC may be configured to receive said reference clock signal, wherein said internally-generated local oscillator signal is based on said reference clock signal.

This may enable the second IC to operate in master mode even when the detected fault interrupts the distribution of a common clock signal to the second IC, for example a common clock signal generated by the first IC.

The reference clock signal may be derived from a crystal oscillator.

The controller may be configured, upon detection of a fault in said first IC, to disable said first IC.

In some embodiments, the radar system comprises a plurality of further ICs, each arranged to receive the common local oscillator signal from the first IC, wherein said second IC is a selected one of said plurality of further ICs.

Each of said further ICs may be arranged to receive said reference clock signal.

The controller may be configured, upon detection of a fault in said first IC, to disable each of said further ICs other than said second IC.

The controller may be adapted to detect a fault in said second IC, and may be configured, upon detection of a fault in said second IC, to send at least one signal to a different selected one of said plurality of further ICs for reconfiguring said different selected one of said plurality of further ICs from said slave mode to said master mode.

The controller may be adapted to detect a fault in said first IC by receiving an error signal from said first IC.

The controller may be adapted to detect a fault in said first IC by detecting an irregularity in radar data obtained using said first IC.

In some embodiments, each of said first IC and said second IC is a respective transceiver. In other embodiments, each of said first IC and said second IC are comprised in a respective one of a transceiver chipset, a receiver chipset or a transmitter chipset.

In some embodiments, said first IC is configurable to generate a common clock signal based on said reference clock signal, wherein said second IC is adapted, when operating in said slave mode, to receive said common clock signal generated by said first IC.

In some embodiments, said first IC is configurable to generate timing control signals based on said reference clock signal, wherein said second IC is adapted, when operating in said slave mode, to receive said timing control signals from said first IC.

The first and second ICs may be identical in structure and/or functionality. The further ICs may be identical to each other in structure and/or functionality.

According to a second aspect of the present invention, there is provided a reconfigurable integrated circuit, selectively configurable for use as said first IC or said second IC in the radar system defined above.

According to a third aspect of the present invention there is provided a method of operating a radar system, the radar system comprising: a first IC arranged to receive a reference clock signal and configurable to generate a common local oscillator signal based on said reference clock signal, a second IC arranged to receive the common local oscillator signal from the first IC, the second IC being selectively configurable for operation in a slave mode, in which said second IC is configured to use the common local oscillator signal output by the first IC, and for operation in a master mode, in which said second IC is configured to use an internally-generated local oscillator signal; the method comprising:

detecting a fault in said first IC, and, on detection of said fault in said first IC, sending at least one signal to said second IC for reconfiguring said second IC from said slave mode to said master mode.

According to a fourth aspect of the present invention there is provided a control system for an autonomous vehicle, the control system comprising a radar system as defined above.

The control system may include a data processing system configured to provide at least one of an electronic brake assist system, a blindspot detection system, a rear cross traffic alert system, and a cruise control system, based on data received from the radar system.

BRIEF DESCRIPTION OF THE DRAWINGS

Embodiments of the present invention will be described, by way of example only, with reference to the accompanying drawings in which like reference signs relate to like elements and in which.

DETAILED DESCRIPTION

Figure 1:
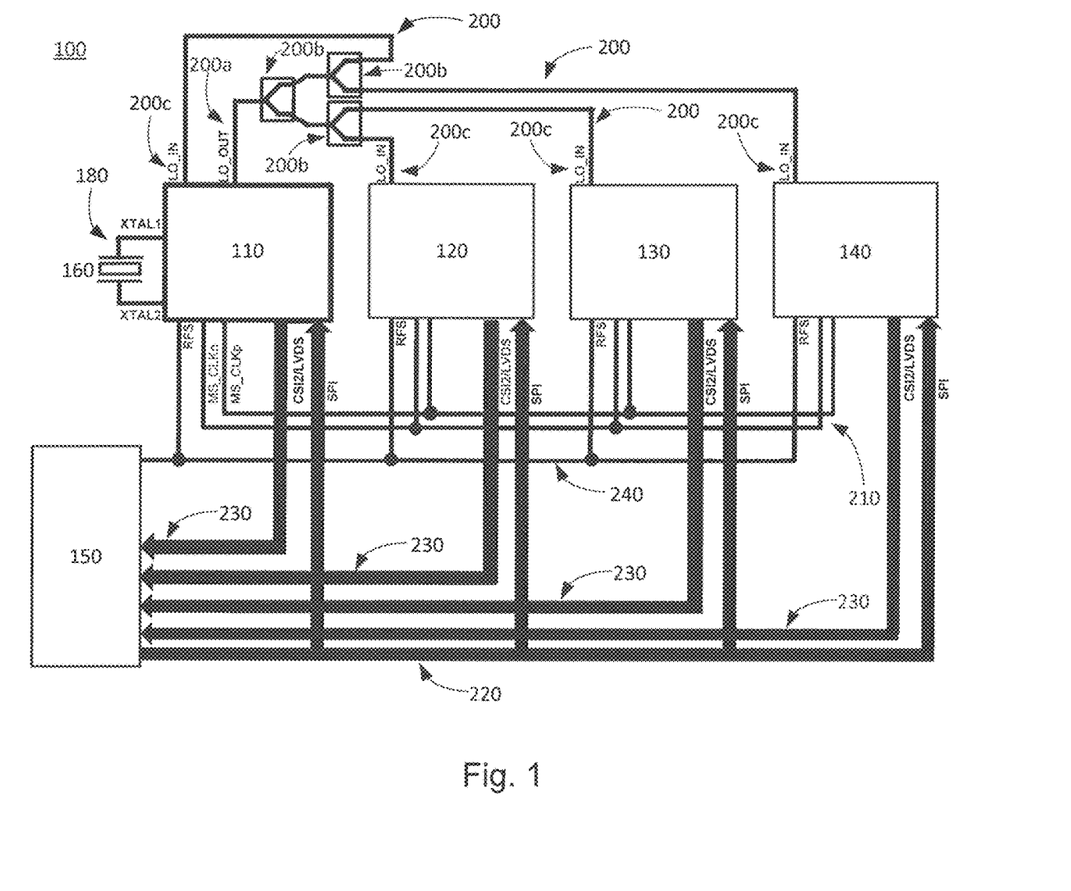
FIG. 1 shows an example configuration of a radar system useful for understanding the present invention.

FIG. 1 shows an example configuration of a cascaded multiple-chip radar sensor system 100, for example an array sensor, useful for understanding the present invention. The system 100 comprises a master transceiver 110 in the form of a master integrated circuit (IC), a number of slave transceivers 120, 130, 140 in the form of slave ICs (of which three are shown in FIG. 1), a controller in the form of a main computing unit (MCU) 150, and a crystal oscillator 160. Typically, each IC 110, 120, 130, 140 includes multiple operational transmit (TX) ports and multiple receiver (RX) ports (not shown).

The crystal oscillator 160 generates a reference clock signal 180 (XTAL1, XTAL2) for the master IC 110. As an example, the reference clock signal 180 may be a differential signal having a frequency of 60 MHz.

The master IC 110 generates a common local oscillator (LO) signal 200, which is output from an LO output port 200a of the master IC 110. The common LO signal 200 is distributed via power splitters/dividers 200b to respective LO input ports 200c of the master IC 110 and slave ICs 120, 130, 140, and is used for the transmit (TX) amplifiers and receiver (RX) mixers (not shown in FIG. 1) of the ICs 110, 120, 130, 140. In practice, the path lengths from the LO output port 200a to each LO input port 200c are aligned to avoid phase differences. The common LO signal 200 may have a frequency of, for example, 38 GHz.

The master IC 110 also generates a common clock signal 210 (MS_CLKn, MS_CLKp), used as a time base for synchronization of the sampling moments on the ADCs on the master and slave ICs. As an example, the common clock signal may be a differential signal having a frequency of 240 MHz.

Both the common LO signal 200 and the common clock signal 210 are derived from the reference clock signal 180 received by the master IC 110 from the crystal oscillator 160.

The master IC 110 also transmits timing control signals (not shown) to the slave ICs 120, 130, 140, for example for triggering timing engines within the slave ICs.

The MCU 150 is connected to the master and slave ICs 110, 120, 130, 140 by SPI (serial peripheral interface) control lines 220 and digital lines 230, for example using CSI-2 or LVDS formats, for receiving data from the master and slave ICs 110, 120, 130, 140. The MCU 150 may comprise digital signal processing (DSP) functionality and may comprise field programmable gate arrays (FPGA). The MCU 150 is also connected to the master and slave ICs 110, 120, 130, 140 by RFS (Radar Frame Start) control lines 240 for triggering the start of a data acquisition sequence.

In the event of a failure of the master IC 110 in the radar system 100, the whole system 100 will fail since the common local oscillator signal 200 and the common clock signal 210 will not be distributed to the slave ICs 120, 130, 140.

Figure 2:
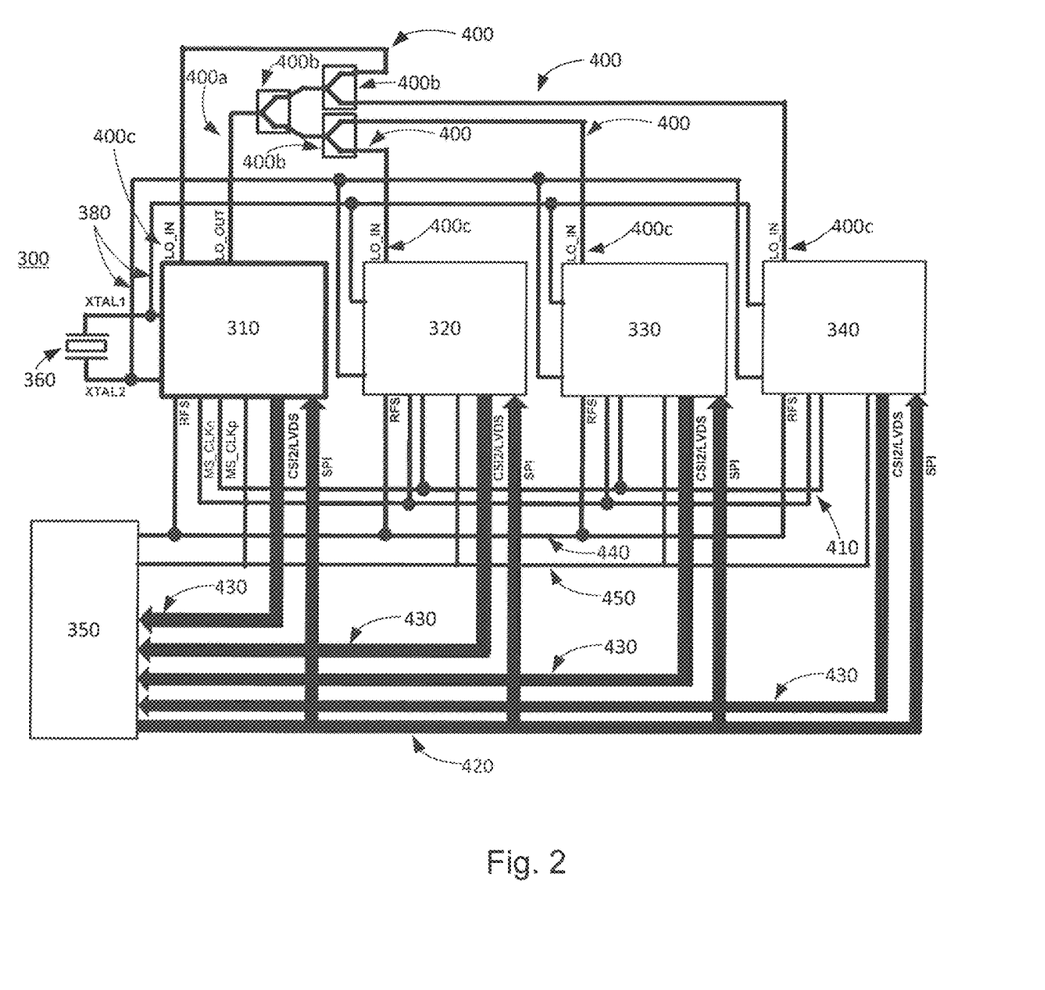
FIG. 2 shows an initial configuration of a multiple-chip radar system according to an example embodiment of the invention.

FIG. 2 shows an example configuration of a multiple-chip radar sensor system 300 according to an embodiment of the present invention. The system 300 comprises a first integrated circuit (IC) 310 in the form of a first transceiver, and a number of further ICs 320, 330, 340 in the form of further transceivers (of which three are shown in FIG. 2), a controller in the form of a main computing unit (MCU) 350, and a crystal oscillator 360. Typically, each IC 310, 320, 330, 140 includes multiple operational transmit (TX) ports and multiple receiver (RX) ports (not shown).

The crystal oscillator 360 generates a reference clock signal 380 (XTAL1, XTAL2) which is distributed to each of the first and further ICs 310, 320, 330, 340. As an example, the reference clock signal 380 may be a differential signal having a frequency of 60 MHz.

As in the previous example, the MCU 350 is connected to the transceivers 310, 320, 330, 340 by SPI (serial peripheral interface) control lines 420 and digital lines 430, for example using CSI-2 or LVDS formats, for receiving data from the transceivers 310, 320, 330, 340. The MCU 350 may comprise digital signal processing (DSP) functionality and may comprise field programmable gate arrays (FPGA). The MCU 350 is also connected to the transceivers 310, 320, 330, 340 by RFS (Radar Frame Start) control lines 440 for triggering the start of a data acquisition sequence.

The radar system 300 differs from the system 100 of the previous example in that the MCU 350 is also connected to each of the transceivers 310, 320, 330, 340 by a master/slave control line 450. This control line 450 is used for enabling a master mode or a slave mode of operation in each transceiver. The master/slave control line 450 may connect to a GPIO input of the respective transceiver 310, 320, 330, 340.

The first transceiver 310 is operable as a master IC for the system 300. When operating as master IC, the first transceiver 310 is configured to generate a common local oscillator (LO) signal 400 and a common clock signal 410

(MS_CLKn, MS_CLKp), each derived from the reference clock signal 380 received by the first transceiver 310 from the crystal oscillator 360. The common LO signal 400 may be output from an LO output port 400a of the first transceiver 310 and distributed via power splitters/dividers 400b to respective LO input ports 400c of the first transceiver 310 and further transceivers 320, 330, 340 to be used for the transmit (TX) amplifiers and receiver (RX) mixers (not shown in FIG. 2) of the transceivers 310, 320, 330, 340. In practice, the path lengths from the LO output port 400a to each LO input port 400c are aligned to avoid phase differences. The common LO signal 400 may have a frequency of, for example, 38 GHz. The common clock signal 410 is used as a time base for synchronization of the sampling moments on the ADCs on the transceivers 310, 320, 330, 340. As an example, the common clock signal may be a differential signal having a frequency of 240 MHz. When operating as master IC, the first transceiver 310 also transmits timing control signals (not shown) to the further transceivers 320, 330, 340, for example for triggering timing engines within the further ICs.

The further transceivers 320, 330, 340 are operable in a slave mode as slave ICs, so that they may be cascaded with the first transceiver 310 operating as master IC. When operating in the slave mode, the further transceivers 320, 330, 340 are configured to use the common local oscillator signal 400 received at their respective LO input ports 400c from the first transceiver 310. When operating in slave mode, the further transceivers 320, 330, 340 are also configured to use the common clock signal 410 received from the first transceiver 310.

However, the further transceivers 320, 330, 340 are also reconfigurable for operation in a master mode. The further transceivers 320, 330, 340 are configured, when operating in the master mode, to use an internally-generated LO signal derived from the reference clock signal 380 received directly from the crystal oscillator 360, instead of using the common LO signal 400 received at its respective LO input port 400c. The further transceivers 320, 330, 340 are also configured, when operating in the master mode, to use a local clock signal derived internally from the reference clock signal 380, instead of using the common clock signal 410 received from the first transceiver 310.

The first transceiver 310 and further transceivers 320, 330, 340 may be ICs identical to each other in structure and functionality, with each transceiver 310, 320, 330, 340 being selectively configurable to operate in a master mode or a slave mode. The initial configuration of each transceiver 310, 320, 330, 340 may be preset or may programmed by the MCU 350 via the master/slave control line 450 during initialisation of the system 300. In other embodiments, the first transceiver 310 may be permanently configured in master mode, for example by connection of a GPIO input to an address ball. Importantly, the further transceivers 320, 330, 340 are reconfigurable by the MCU 350 via the master/slave control line 450 to operate in the master mode following initial configuration in the slave mode.

FIG. 2 illustrates the radar system 300 in an initial configuration, in which the first transceiver 310 is configured to operate as a master IC, and the further transceivers 320, 330, 340 are each configured to operate in the slave mode and thereby operate as slave ICs. This configuration may be used for normal operation of the radar system 300. The slave ICs 320, 330, 340 are configured to use the common LO signal 400 and common clock signal 410 received from the master IC 310.

The MCU 350 includes fault detection functionality for detecting a fault in the first transceiver 310 or further transceivers 320, 330, 340, for example a fault in an internal phase locked loop (PLL) of one of the transceivers. The MCU 350 may be configured to detect a fault in any one of the transceivers 310, 320, 330, 340 by receiving an error signal forwarded from the respective transceiver on detection of an internal fault. For example, each transceiver 310, 320, 330, 340 may be configured to perform a self-test (e.g. to check if the PLL is locked and/or if a transmitted frequency is correct) and to forward an error signal or interrupt signal to the MCU 350 if the self-test results in a fail. Alternatively, or in addition, the MCU 350 may be programmed to detect some errors directly, for example the MCU 350 may be configured to detect an irregularity in radar data obtained using a particular transceiver, such as an irregularity in an FFT of the radar data, and to interpret such an irregularity as an indication of a fault.

Upon detection by the MCU 350 of a fault or failure of the first transceiver 310 of the radar system 300, during operation in the initial configuration described above with reference to FIG. 2, the MCU 350 sends a signal or signals to a second transceiver 320, via the master/slave control line 450, the second transceiver 320 being one of the further transceivers 320, 330, 340 described above, for reconfiguring the second transceiver 320 from slave mode to master mode. Following reconfiguration to operate in the master mode, the second transceiver 320 uses a local, internally-generated LO and a local clock signal, each derived from the reference clock signal 380 received directly from the crystal oscillator 360. However, the local LO signal generated by the second transceiver 320 is not output since there is no provision in the present embodiment for distribution of an LO signal from the second transceiver 320 to the other transceivers 330, 340.

Reconfiguration of the second transceiver 320 may be digitally controlled by the MCU 350, wherein the second transceiver 320 automatically implements automatically the reconfiguration process on receipt of a control signal from the MCU 350, via the master/slave control line 450 indicating reconfiguration from the slave mode to the master mode. Alternatively, the MCU 350 may send multiple commands to the second transceiver 320 to implement respective multiple steps of the reconfiguration process. For example, the reconfiguration process may require steps such as switching on an internal PLL of the second transceiver 320 for generating a local LO signal, switching the LO signal source from the LO input 400c of the second transceiver 320 to the local, internally-generated LO signal, and switching the clock signal source from the common clock signal 410 to an internally-generated local clock signal. The reconfiguration of the second transceiver 320 may be performed by changing the states of various internal switching devices of the second transceiver 320.

Figure 3:
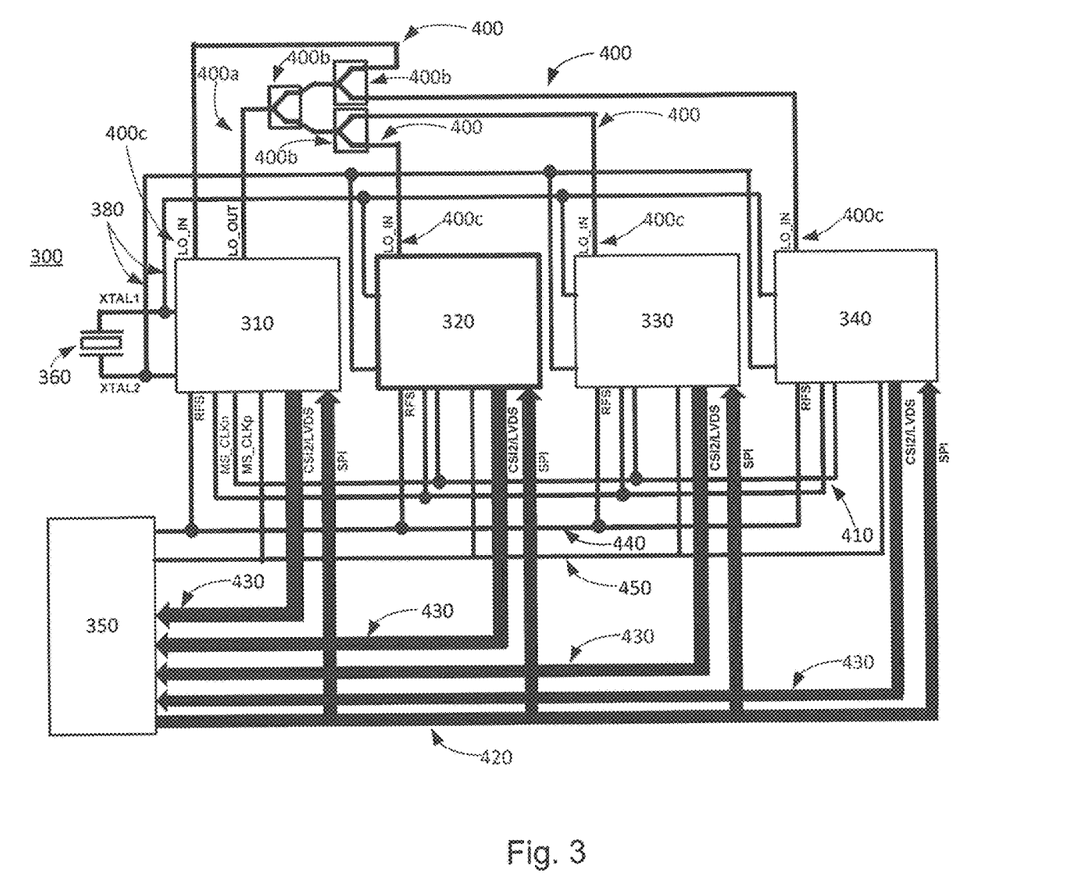
FIG. 3 shows a 'fail functional' configuration of the multiple-chip radar system of FIG. 2, following detection of a fault in a first IC of the system.

Following detection of a fault in the first transceiver, the MCU 350 also disables the first transceiver 310, the circuitry for distribution of the common LO signal 400, and the further transceivers 330, 340 other than the second transceiver 320. As a result, the radar system 300 is reconfigured to the configuration shown in FIG. 3. In FIG. 3, the parts of the system labelled 310, 330, 340, 400, 400a, 400b, 400c, LO_IN and LO_OUT are inactive.

In the radar system 300 reconfigured as shown in FIG. 3, the second transceiver 320 operates as a standalone transceiver, thereby enabling the radar system 300 to provide a minimal level of functionality even in the event of a fault in the first transceiver 310. This configuration of the system 300, shown in FIG. 3, may therefore be referred to as a 'fail functional' configuration.

In other embodiments, the remaining further transceivers 330, 340 may also be reconfigured to operate in master mode in the same way as the second transceiver 320, to provide an alternative fail functional configuration. However, without any provision for sharing a common LO signal, they each operate in a standalone manner using their respective internally-generated LO signal derived from the reference clock signal 380 from the crystal oscillator 360.

If the MCU 350 detects a fault in one of the further transceivers 320, 330 340 during normal operation of the radar system 300 in the initial configuration shown in FIG. 2, the MCU 350 disables the faulty transceiver but does not reconfigure any of the other transceivers 310, 320, 330, 340. However, upon detection of a fault in the second transceiver 320 during operation of the system 300 in the fail functional configuration shown in FIG. 3, the MCU 350 sends a signal to a third transceiver 330, the third transceiver 330 being one of the further transceivers 330, 340 other than the second transceiver 320, for reconfiguring the third transceiver 330 from slave mode to master mode, and disables the faulty second transceiver 320. In this way, the system 300 may continue to operate in a further fail functional configuration.

The radar system 300 shown in FIGS. 2 and 3 includes three further transceivers 320, 330, 340, each configured to receive the reference clock signal 380 from the crystal oscillator 360 and each configured for control via the master/slave control line 450 such that the MCU 350 may reconfigure any of the further transceivers 320, 330, 340 between slave and master modes. As a result, the MCU 350 may select any one of the further transceivers 320, 330, 340 as the second transceiver for standalone operation following detection of a fault in the first transceiver 310. In other embodiments of the invention, the radar system may include any number, equal to or greater than one, of such further transceivers 320, 330, 340. The number provided may depend on the degree of redundancy required. In some embodiments of the invention, the radar system may also include a number of slave transceivers which are not configured for standalone operation, for example, not configured to receive the reference clock signal 380. In other embodiments, all the slave transceivers of the radar system may be configured for reconfiguration between slave and master modes.

The radar system 300 described above includes ICs in the form of integrated transceivers 310, 320, 330, 340. However, in other embodiments of the invention, the ICs of the radar system may be provided by chipsets. The chipsets may be transceiver, transmitter or receiver chipsets.

Figure 4:
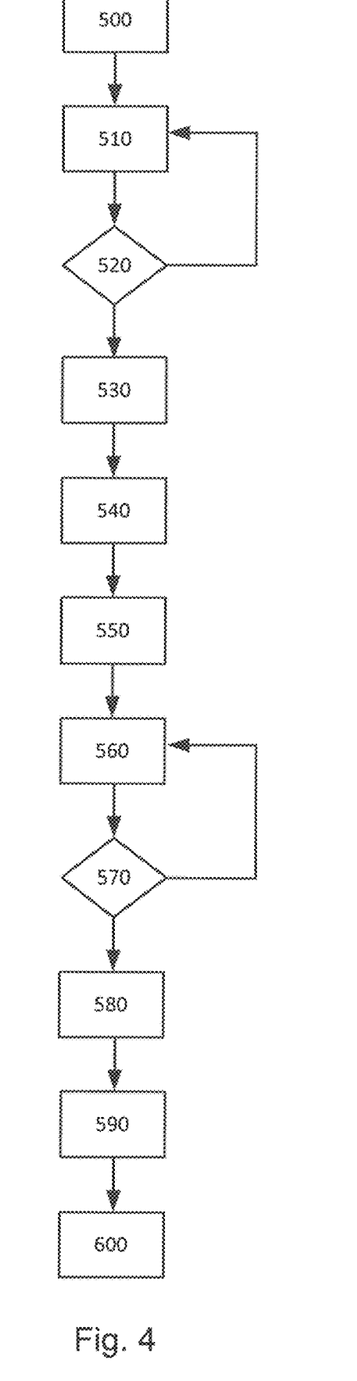
FIG. 4 is a flow diagram illustrating a method according to an example embodiment of the invention.

FIG. 4 illustrates a method of operation of the radar system 300 shown in FIGS. 2 and 3.

In a first step 500, the MCU 350 sends a signal via the master/control line 450 to initialise the system 300 for normal operation by configuring the first transceiver 310 in master mode and the further transceivers 320, 330, 340 in slave mode. This step may be optional if the initial configurations of the transceivers are preset.

In a next step 510, the radar system 300 operates normally in the initial configuration. The radar system 300 operates as a cascasded system with the first transceiver 310 as master and the further transceivers 320, 330, 340 as slaves. The further transceivers 320, 330, 340 use the common LO signal 400 and common clock signal 410 received from the first transceiver 310.

In a next step 520, the MCU 350 monitors for faults in the first transceiver 310. If no fault is detected, the method returns to step 510. If a fault is detected, for example by receiving an error signal from the first transceiver 310, the method proceeds to step 530.

At step 530, the MCU 350 disables the first transceiver 310. This step may be optional, for example if the first transceiver 310 automatically deactivates on detection of an internal fault.

In a next step 540, the MCU 350 sends a signal to the second transceiver 320 instructing reconfiguration of the second transceiver 320 from slave mode to master mode. On receipt of this signal, the second transceiver 320 automatically reconfigures such that it uses an internally-generated local LO signal derived from the reference clock signal 380 received directly from the crystal oscillator 360.

In a next step 550, the MCU 350 disables the other further transceivers 330, 340 (not including the second transceiver 320). This step is optional.

In a next step 560, the radar system 300 operates in a fail functional configuration. The second transceiver 320 uses an internally-generated local LO signal derived from the reference clock signal 380.

In a next step 570, the MCU 350 monitors for faults in the second transceiver 320. If no fault is detected, the method returns to step 560. If a fault is detected, for example by receiving an error signal from the second transceiver 320, the method proceeds to step 580.

At step 580, the MCU 350 disables the second transceiver 320. This step may be optional, for example if the second transceiver 320 automatically deactivates on detection of an internal fault.

In a next step 590, the MCU 350 sends a signal to the third transceiver 330 instructing reconfiguration of the third transceiver 330 from slave mode to master mode and/or to enable the third transceiver 330. On receipt of this signal, the third transceiver 330 automatically reconfigures such that it uses an internally-generated local LO signal derived from the reference clock signal 380 received directly from the crystal oscillator 360.

In a next step 600, the radar system 300 operates in a further fail functional configuration. The third transceiver 330 uses an internally-generated LO signal derived from the reference clock signal 380.

Although particular embodiments of the invention have been described above, it will be appreciated than many modifications, including additions and/or substitutions, may be made within the scope of the appended claims.

The invention claimed is:

1. A radar system comprising:
    a first IC, arranged to receive a reference clock signal and configured to generate a common local oscillator signal based on the reference clock signal;
    a second IC, arranged to receive the reference clock signal and to receive the common local oscillator signal from said first IC; and
    a controller, adapted to detect a first fault in said first IC, and configured, upon detection of the first fault in said first IC, to send at least one first configuration signal to said second IC for reconfiguring said second IC from a slave mode to a master mode and to send at least one second configuration signal to said first ID for disabling said first IC;
    wherein, when operating in the slave mode, said second IC is configured to use the common local oscillator signal generated by said first IC, and, when operating in the master mode, said second IC is configured to use an internally-generated local oscillator signal generated based on the reference clock signal.

2. The radar system according to claim 1, wherein said second IC is configured to receive the reference clock signal, wherein said internally-generated local oscillator signal is based on the reference clock signal.

3. The radar system according to claim 1, wherein the reference clock signal is derived from a crystal oscillator.

4. The radar system according to claim 1, wherein said controller is configured, upon detection of the first fault in said first IC, to disable said first IC.

5. The radar system according to claim 1, comprising a plurality of further ICs, each arranged to receive the common local oscillator signal from said first IC, wherein said second IC is a selected one of said plurality of further ICs.

6. The radar system according to claim 5, wherein each said further IC is arranged to receive the reference clock signal.

7. The radar according to claim 5, wherein said controller is configured, upon detection of the first fault in said first IC, to disable each of said further ICs other than said second IC.

8. The radar system according to claim 5, wherein said controller is adapted to detect a second fault in said second IC, and is configured, upon detection of the second fault in said second IC, to send the at least one third configuration signal to a different selected one of said plurality of further ICs for reconfiguring said different selected one of said plurality of further ICs from the slave mode to the master mode.

9. The radar system according to claim 1, wherein said controller is adapted to detect the first fault in said first IC by receiving an error signal from said first IC.

10. The radar system according to claim 1, wherein said controller is adapted to detect the first fault in said first IC by detecting an irregularity in radar data obtained using said first IC.

11. The radar system according to claim 1, wherein each of said first IC and said second IC is a transceiver IC or is comprised in a transceiver, transmitter, or receiver chipset.

12. The radar system according to claim 1, wherein said first IC is configured to generate a common clock signal based on the reference clock signal, wherein said second IC is adapted, when operating in the slave mode, to use the common clock signal generated by said first IC.

13. A method of operating a radar system, the radar system comprising: a first IC arranged to receive a reference clock signal and configured to generate a common local oscillator signal based on the reference clock signal, a second IC arranged to receive the reference clock signal and to receive the common local oscillator signal from said first IC, said second IC being selectively configurable for operation in a slave mode, in which said second IC is configured to use the common local oscillator signal output by said first IC, and for operation in a master mode, in which said second IC is configured to use an internally-generated local oscillator signal generated based on the reference clock signal; the method comprising:
  detecting a fault in said first IC, and
  on detection of said fault in said first IC:
    sending at least one first configuration signal to said second IC for reconfiguring said second IC from the slave mode to the master mode; and
    sending at least one second configuration signal to said first ID for disabling said first IC.

14. A control system for an autonomous vehicle, the control system comprising a radar system comprising:
  a first IC, arranged to receive a reference clock signal and configured to generate a common local oscillator signal based on the reference clock signal;
  a second IC, arranged to receive the reference clock signal and to receive the common local oscillator signal from said first IC; and
  a controller, adapted to detect a first fault in said first IC, and configured, upon detection of the first fault in said first IC, to send at least one first configuration signal to said second IC for reconfiguring said second IC from a slave mode to a master mode and to send at least one second configuration signal to said first ID for disabling said first IC;
  wherein, when operating in the slave mode, said second IC is configured to use the common local oscillator signal generated by said first IC, and, when operating in the master mode, said second IC is configured to use an internally-generated local oscillator signal generated based on the reference clock signal.

15. The method of claim 13, wherein on detection of said first fault in said first IC, disabling said first IC.

16. The method of claim 13, further comprising receiving at a plurality of further ICs the common local oscillator signal from said first IC, wherein said second IC is a selected one of said plurality of further ICs.

17. The method of claim 16, further comprising receiving the reference clock signal at each of the plurality of further ICs.

18. The method of claim 16, further comprising detecting a second fault in said second IC and sending the at least one third configuration signal to a different selected one of said plurality of further ICs for reconfiguring said different selected one of said plurality of further ICs from the slave mode to the master mode.

19. The method of claim 13, wherein detecting the first fault in said first IC further comprises detecting an irregularity in radar data obtained using said first IC.

20. The method of claim 13, further comprising adapting said second IC, when operating in the slave mode, to use the common clock signal generated by said first IC.

* * * * *